United States Patent
Yoon et al.

(10) Patent No.: US 11,148,084 B2
(45) Date of Patent: Oct. 19, 2021

(54) STERILIZATION KIT FOR WATER TREATMENT APPARATUS

(71) Applicant: LG ELECTRONICS INC., Seoul (KR)

(72) Inventors: Heesang Yoon, Seoul (KR); Myounghoon Lee, Seoul (KR); Jaegeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 16/607,281

(22) PCT Filed: Apr. 6, 2018

(86) PCT No.: PCT/KR2018/004053
§ 371 (c)(1),
(2) Date: Oct. 22, 2019

(87) PCT Pub. No.: WO2018/199497
PCT Pub. Date: Nov. 1, 2018

(65) Prior Publication Data
US 2020/0384393 A1    Dec. 10, 2020

(30) Foreign Application Priority Data

Apr. 25, 2017   (KR) .................. 10-2017-0052731

(51) Int. Cl.
*B01D 35/18* (2006.01)
*C02F 1/02* (2006.01)
(Continued)

(52) U.S. Cl.
CPC .............. *B01D 35/18* (2013.01); *B08B 9/027* (2013.01); *C02F 1/001* (2013.01); *C02F 1/02* (2013.01);
(Continued)

(58) Field of Classification Search
CPC .................. C02F 9/00; B01D 35/18
(Continued)

(56) References Cited

U.S. PATENT DOCUMENTS 9,656,896 B2 *   5/2017   Kim ................... C02F 9/005
9,896,360 B2 *   2/2018   Garusi ................. A01N 59/00
(Continued)

FOREIGN PATENT DOCUMENTS

JP   2000-241022 A   9/2000
JP   2002-070095     3/2002
(Continued)

OTHER PUBLICATIONS

Shady Yehia: "Applying heat exchanger control strategies"; Jan. 4, 2016; https:/_/www.controleng.com/articles/applying-heat-exchanger-control-strategies/.

(Continued)

*Primary Examiner* — Nina Bhat
(74) *Attorney, Agent, or Firm* — KED & Associates LLP (57) ABSTRACT

A sterilization kit for a liquid treatment apparatus may include a liquid inlet passage into which the raw liquid is introduced from the outside, a hot liquid module and a liquid outlet passage. The hot liquid module may include a hot liquid tank in which the raw liquid introduced through the liquid inlet passage is received, a heat generation unit heating the liquid received in the hot liquid tank, and a controller disposed to be spaced apart from the outside of the hot liquid tank to control the heat generation unit.

17 Claims, 4 Drawing Sheets

[Fig. 2]

(51) Int. Cl.
*B08B 9/027* (2006.01)
*C02F 1/00* (2006.01)

(52) U.S. Cl.
CPC ..... *B08B 2209/027* (2013.01); *C02F 2209/02* (2013.01); *C02F 2209/40* (2013.01)

(58) Field of Classification Search
USPC .................................. 210/136; 422/28, 291
See application file for complete search history.

(56) References Cited

U.S. PATENT DOCUMENTS

| | | | | |
|---|---|---|---|---|
| 10,167,208 | B2* | 1/2019 | Lee | C02F 1/4672 |
| 10,266,441 | B2* | 4/2019 | Lee | C02F 9/005 |
| 2007/0256977 | A1* | 11/2007 | Schmitt | B01D 61/12 |
| | | | | 210/652 |
| 2015/0329391 | A1* | 11/2015 | Garusi | C02F 1/76 |
| | | | | 210/739 |
| 2016/0229715 | A1* | 8/2016 | Kim | C02F 9/005 |
| 2018/0370831 | A1* | 12/2018 | Moon | C02F 1/441 |

FOREIGN PATENT DOCUMENTS

| | | |
|---|---|---|
| KR | 10-1143791 | 5/2012 |
| KR | 10-1164517 | 7/2012 |
| KR | 10-1164722 | 7/2012 |
| KR | 2016-0097910 A | 8/2016 |

OTHER PUBLICATIONS

Indian Office Action dated Mar. 20, 2020 issued in Application No. 201917044894.
International Search Report and Written Opinion dated Nov. 20, 2018 issued in Application No. PCT/KR2018/004053.
Korean Office Action dated Jun. 10, 2021 issued in Application 10-2017-0052731.

* cited by examiner

STERILIZATION KIT FOR WATER TREATMENT APPARATUS

CROSS-REFERENCE TO RELATED PATENT APPLICATIONS

This application is a U.S. National Stage Application under 35 U.S.C. § 371 of PCT Application No. PCT/KR2018/004053, filed Apr. 6, 2018, which claims priority to Korean Patent Application No. 10-2017-0052731, filed Apr. 25, 2017, whose entire disclosures are hereby incorporated by reference.

1. FIELD

The present disclosure relates to a sterilization kit for a water treatment apparatus.

2. BACKGROUND

In general, water purifiers are devices that filter water supplied from a water supply source by using physical and chemical methods to remove impurities and then supply the purified water.

Water purifiers may be classified into natural filtration-type water purifiers, direct filtration-type water purifiers, ion exchange resin-type water purifiers, distillation-type water purifiers, reverse osmotic pressure-type water purifiers, and the like according to purification principles or manners.

Also, water purifiers are classified into storage-type water purifiers in which water purified by passing through a filter is stored in a water tank and then discharged after being heated or cooled and direct-type water purifiers in which water purified by passing through a filter without a water storage tank is heated or cooled and then discharged.

Since drinking water supply devices such as water purifiers supply at least one of purified water, cold water, and hot water for human consumption, hygiene is very important.

However, when such a water purifier is used for a long time, foreign substances may be trapped in an internal passage, a valve, a cock, and the like, through which water flows, to deteriorate hygiene due to propagation of bacteria such as microorganisms.

As described above, to remove contamination of the water purifier, a sterilization kit may be installed in the water purifier or be independently provided with respect to the water purifier and connected to the water purifier to sterilize the water purifier.

For example, in the sterilization kit according to the related art, water is electrolyzed in an electrolytic cell to generate sterilizing water containing a sterilizing material, and then, the sterilizing water is drained or circulated while flowing through a water tank, a tube, and the like to sterilize the water purifier.

For another example, in the sterilization kit according to the related art, hot water is generated by a hot water module, and the generated hot water is drained or circulated while flowing through a water tank, a tube, and the like to sterilizes the water purifier.

However, in case of the sterilization kit using hot water, it is necessary to provide a heat dissipation unit for dissipating heat generated in a heating part for heating water contained in the hot water module or a driving part (e.g., a 'triac') for driving the heating part.

However, in case of the sterilization kit according to the related art, the heat dissipation unit for dissipating heat generated in the heating part and the driving part of the hot water module provided in the sterilization kit is not provided to deteriorate performance of the heating part and the driving part for driving the heating part and thereby to deteriorate safety.

Also, even though the heat dissipation unit is provided, there is a limitation that the heat dissipation is not completely performed because the heat dissipation depends on air cooling.

In addition, there is a limitation that it is difficult to mount the separate heat dissipation unit in the miniaturized sterilization kit.

In one embodiment, a sterilization kit for a water treatment apparatus, which supplies hot water to the water treatment apparatus, in which raw water supplied from the outside is purified by passing through a filter and discharged after being cooled or heated as occasion demands, to sterilize the water treatment apparatus, includes: a water inlet passage into which the raw water is introduced from the outside; a hot water module including a hot water tank in which the raw water introduced through the water inlet passage is received, a heat generation unit heating the water received in the hot water tank, and a controller disposed to be spaced apart from the outside of the hot water tank to control the heat generation unit; and a water outlet passage through which hot water heated in the hot water module is discharged to the water treatment apparatus, wherein at least a portion of the water inlet passage passes through the controller and is heat-exchanged with the controller.

The water inlet passage may include: an inlet part into which the raw water is introduced from the outside; a heat exchange part connected to the water inlet part and disposed to pass through the controller; and a connection part connecting the heat exchange part to the hot water tank.

The water inlet part and the connection part may be disposed in parallel to be spaced apart from each other.

The heat exchange part may be bent in an arch shape so that the water introduced through the water inlet passage is discharged to the connection part.

The sterilization kit may further include a heat transfer member coming into surface contact with the controller and the heat exchange part to transfer heat of the controller to the heat exchange part.

The heat transfer member may include: a first heat transfer member having one surface coming into surface contact with the controller and the other surface with an accommodation groove in which a portion of the heat exchange part is accommodated; and a second heat transfer member having one surface with an accommodation groove in which the rest portion of the heat exchange part is accommodated and coupled to the first heat transfer member.

An adhesion layer may be disposed between the heat transfer member and the controller.

The controller may be disposed above the hot water tank.

At least one of a decompression valve reducing a pressure of the introduced raw water or a raw water valve controlling a flow of the introduced raw water may be provided in the inlet part.

At least one of a flow rate sensor detecting a flow rate of the raw water that is heat-exchanged with the controller while passing through the controller and a flow rate adjustment valve adjusting the flow rate of the raw water may be provided in the connection part.

An end of the water inlet passage may be connected to a lower portion of the hot water tank, and the water outlet passage may be connected to an upper portion of the hot water tank.

The sterilization kit may further include a cleaning passage branched from the water inlet passage and connected to the water outlet passage after bypassing the hot water module.

A cleaning valve controlling a flow of a fluid may be provided in the cleaning passage.

The connection part may include at least one of a first temperature sensor measuring a temperature of water introduced into the hot water tank, a second temperature sensor measuring a temperature of water received in the hot water tank, and a third temperature sensor measuring a temperature of water discharged from the hot water tank.

A steam passage through which steam generated in the hot water tank is discharged may be connected to the hot water tank, and a safety valve opened at a pressure that is above a preset allowable pressure may be provided in the steam passage.

The details of one or more embodiments are set forth in the accompanying drawings and the description below. Other features will be apparent from the description and drawings, and from the claims.

In one embodiment, a sterilization kit for a water treatment apparatus, which supplies hot water to the water treatment apparatus, in which raw water supplied from the outside is purified by passing through a filter and discharged after being cooled or heated as occasion demands, to sterilize the water treatment apparatus, the sterilization kit includes: a water inlet passage into which the raw water is introduced from the outside; a hot water module comprising a hot water tank in which the raw water introduced through the water inlet passage is received, a heat generation unit heating the water received in the hot water tank, and a controller disposed to be spaced apart from the outside of the hot water tank to control the heat generation unit; and a water outlet passage through which hot water heated in the hot water module is discharged to the water treatment apparatus, wherein at least a portion of the water inlet passage passes through the controller and is heat-exchanged with the controller.

The water inlet passage may include: an inlet part into which the raw water is introduced from the outside; a heat exchange part connected to the water inlet part and disposed to pass through the controller; and a connection part connecting the heat exchange part to the hot water tank.

The water inlet part and the connection part may be disposed in parallel to be spaced apart from each other.

The heat exchange part may be bent in an arch shape so that the water introduced through the water inlet passage is discharged to the connection part.

The sterilization kit may further include a heat transfer member coming into surface contact with the controller and the heat exchange part to transfer heat of the controller to the heat exchange part.

The heat transfer member may include: a first heat transfer member having one surface coming into surface contact with the controller and the other surface with an accommodation groove in which a portion of the heat exchange part is accommodated; and a second heat transfer member having one surface with an accommodation groove in which the rest portion of the heat exchange part is accommodated and coupled to the first heat transfer member.

An adhesion layer may be disposed between the heat transfer member and the controller.

The controller may be disposed above the hot water tank.

At least one of a decompression valve reducing a pressure of the introduced raw water or a raw water valve controlling a flow of the introduced raw water is provided in the inlet part.

At least one of a flow rate sensor detecting a flow rate of the raw water that is heat-exchanged with the controller while passing through the controller and a flow rate adjustment valve adjusting the flow rate of the raw water is provided in the connection part.

An end of the water inlet passage may be connected to a lower portion of the hot water tank, and the water outlet passage is connected to an upper portion of the hot water tank.

The sterilization kit may further include a cleaning passage branched from the water inlet passage and connected to the water outlet passage after bypassing the hot water module.

A cleaning valve may control a flow of a fluid is provided in the cleaning passage.

The connection part may include at least one of a first temperature sensor measuring a temperature of water introduced into the hot water tank, a second temperature sensor measuring a temperature of water received in the hot water tank, and a third temperature sensor measuring a temperature of water discharged from the hot water tank.

A steam passage through which steam generated in the hot water tank is discharged is connected to the hot water tank, and a safety valve opened at a pressure that is above a preset allowable pressure is provided in the steam passage.

According to the embodiment, the heat generated in the controller may be dissipated through the simple manner in which a portion of the water inlet passage into which the raw water is introduced is disposed to pass through the controller, and the raw water supplied into the hot water tank may preheat the raw water.

Also, the raw material introduced into the hot water tank may be preheated to minimize a different between the outlet water temperature and the inlet water temperature with respect to the hot water tank, thereby efficiently generating the hot water.

Also, the heat generated in the controller may be easily dissipated through the simple operation of changing the arrangement of the water inlet passage of the sterilization kit produced in the past, and the raw water supplied into the hot water tank may be preheated.

Also, the heat dissipation of the controller may be performed in the water cooling type to more surely dissipate the heat.

Also, since it is unnecessary to provide the separate heat dissipation unit such as the blowing fan, it may be advantageous in space utilization, and thus, the space may be reduced to miniaturize the sterilization kit.

Also, since the heat generated in the controller remains in the sterilization kit or is not released, the safety accident may be prevented.

Also, since the heat generated in the controller is not discarded into the atmosphere, but is used to preheat the raw water, it may be advantageous in view of energy efficiency.

Also, the controller may be disposed closer to the manipulation part disposed thereabove to minimize the wiring and easily respond to safety accident such as the leakage of water.

Also, the general cleaning as well as the hot water sterilization may be enabled.

Also, the controller may be prevented from increasing in temperature and thus from being damaged. In addition, the

DETAILED DESCRIPTION OF THE INVENTION

Hereinafter, exemplary embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings attached to the following embodiments are embodiments of the scope of the invention, but to facilitate understanding within the scope of the present invention, in the description of the fine portions, the drawings may be expressed differently according to the drawings, and the specific portions may not be displayed according to the drawings, or may be exaggerated according to the drawings.

The present disclosure relates to a sterilization kit, which supplies hot water to a water treatment apparatus, in which raw water supplied from the outside is purified by passing through a filter and then discharged after being cooled or heated as occasion demands, to sterilize the water treatment apparatus.

The sterilization kit may be classified into a separation-type sterilization kit which is separately provided with respect to a water treatment apparatus and then temporarily connected to the water treatment apparatus when the water treatment apparatus is sterilized by using hot water and an integral-type sterilization kit which is always provided inside a water treatment apparatus.

Also, the term "water treatment apparatus" referred to in the present disclosure may include a water purifier, a bidet, a water softener, and the like as well as various devices for changing a state of raw water through heating, cooling, or purifying after introducing the raw water from the outside.

Hereinafter, a sterilization kit according to an embodiment will be described in detail with reference to the accompanying drawings.

Figure 1:
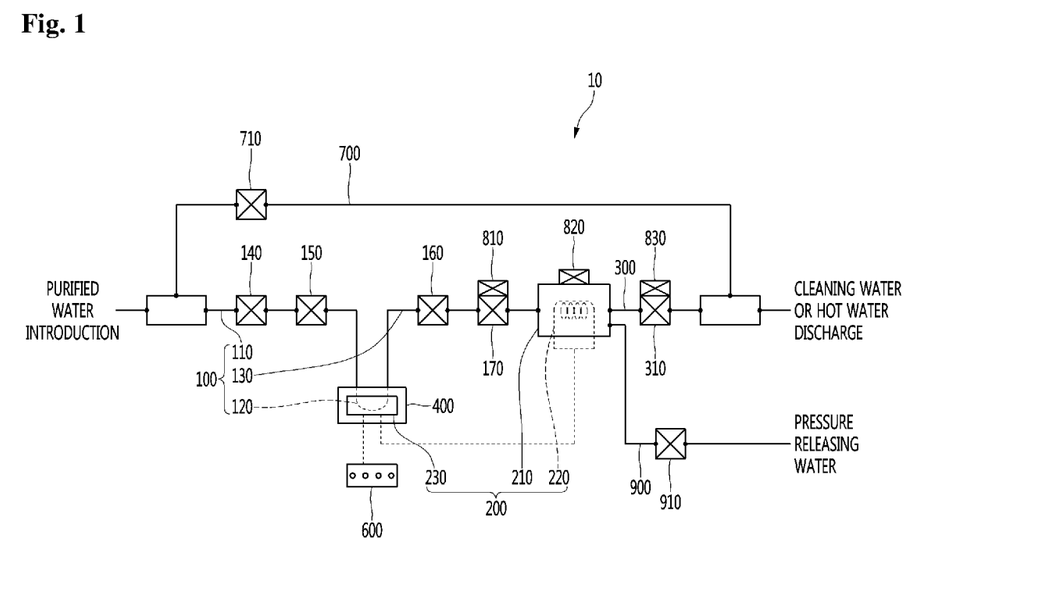
FIG. 1 is a schematic conceptual view illustrating a configuration of a sterilization kit for a water treatment apparatus according to an embodiment.
Figure 2:
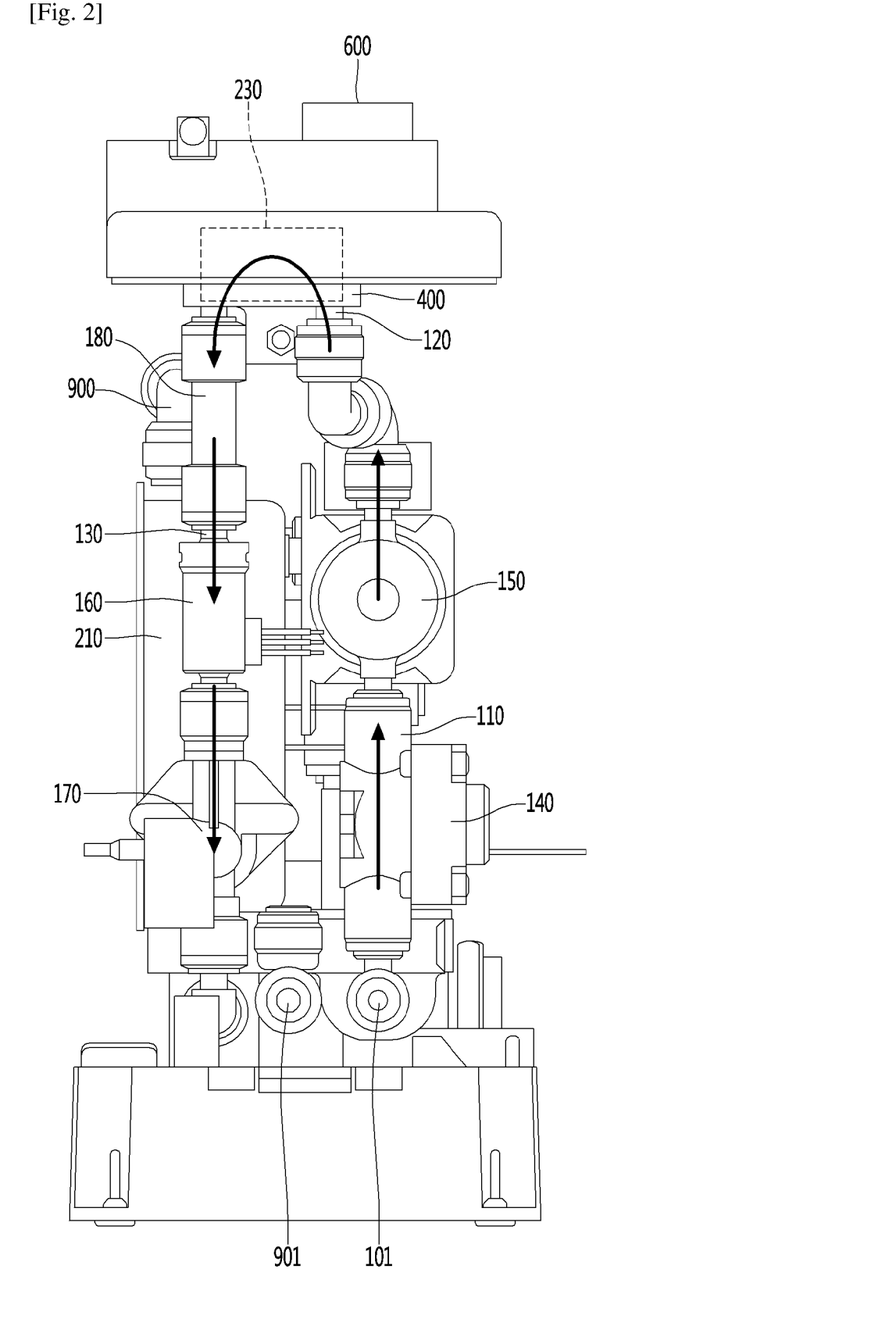
FIG. 2 is a front view of the sterilization kit for the water treatment apparatus according to an embodiment.
Figure 3:
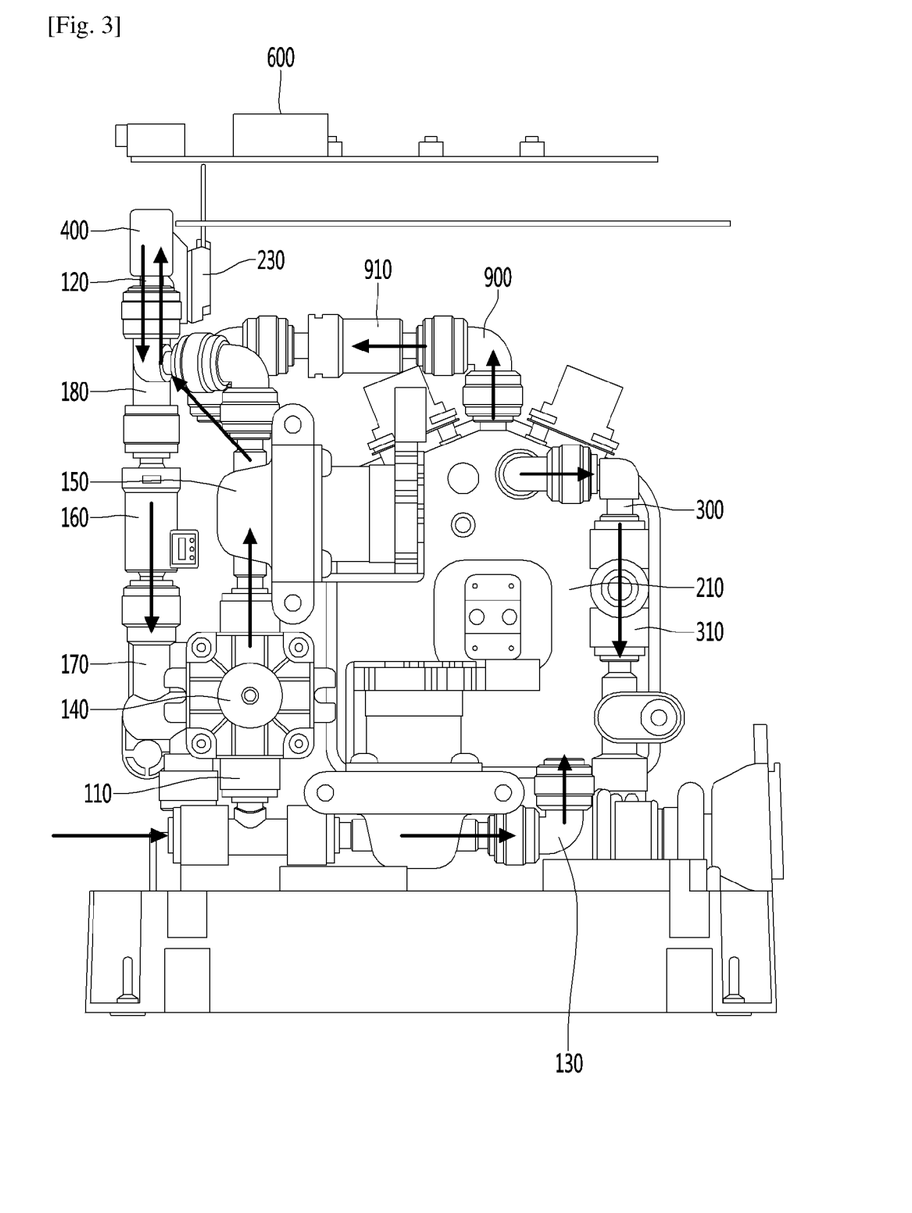
FIG. 3 is a side view of the sterilization kit for the water treatment apparatus according to an embodiment.

FIG. 1 is a schematic conceptual view illustrating a configuration of a sterilization kit for a water treatment apparatus according to an embodiment, FIG. 2 is a front view of the sterilization kit for the water treatment apparatus according to an embodiment, and FIG. 3 is a side view of the sterilization kit for the water treatment apparatus according to an embodiment.

Referring to FIGS. 1 to 3, a sterilization kit 10 according to an embodiment may include a water inlet passage 100 into raw material is introduced from the outside, a hot water module 200 discharging the raw water introduced through the water inlet passage 100 after heating, a water outlet passage 300 discharging the hot water heated in the hot water module 200 to a water treatment apparatus, and a case (not shown) in which the water inlet passage 100, the hot water module 200, and the water outlet passage 300 are disposed.

In this embodiment, the water inlet passage 100 may receive purified water filtered in the water treatment apparatus or directly receive raw water that does not pass through the water treatment apparatus, i.e., that is not filtered.

Also, the hot water discharged from the water outlet passage 300 may be discharged out of the water treatment apparatus after sterilizing a tube, a valve, and the like of the water treatment apparatus while circulating through the water treatment apparatus and also may recirculate after being resupplied into the sterilization kit 10 through the water inlet passage 100.

Also, a water outlet valve 310 controlling a flow of the hot water flowing to the outside via the water outlet passage 300 may be provided in the water outlet passage 300.

The sterilization kit 10 may be provided with a pumping unit for circulation of a fluid or may not include a separate pumping unit. If the pumping unit is not provided, the fluid within the sterilization kit 10 may flow from the water inlet passage 100 to the water outlet passage 300 by a water pressure of the raw water.

The hot water module 200 may include a hot water tank 210 in which the raw water introduced through the water inlet passage 100 is received, a heat generation unit 220 heating the water received in the hot water tank 210, and a controller 230 disposed to be spaced apart from the outside of the hot water tank 210 to control the heat generation unit 220.

Here, the heat generation unit 220 may be provided in the hot water tank 210 or provided outside the hot water tank 210. Also, the heat generation unit 220 may be implemented in various manners according to various embodiments as long as the raw water received in the hot water tank 210 is heated, for example, may be implemented in a heating wire manner or an induction heating manner.

In the hot water module 200, the raw water introduced into the hot water tank 210 may be discharged out of the hot water tank 210 after being heated by the heat generation unit 220, and the discharged hot water may be supplied as hot water for sterilizing the water treatment apparatus.

In this process, heat may be generated in the controller 230 controlling the heat generation unit 220, e.g., a triac, a PCB, or the like. Thus, to remove the generated heat, heat dissipation measures have to be necessarily prepared.

In the related art, a blowing fan may be mounted in the vicinity of the controller 230 to dissipate the heat through air cooling. However, it is difficult to except perfect heat dissipation through the above-described heat dissipation manner, and also, it is difficult to mount a separate heat dissipation unit inside the miniaturized sterilization kit. Also, there is a limitation that hot air remains in the sterilization kit or is discharged out of the sterilization kit. Also, there is a limitation that heat energy generated in the controller 230 is discarded into the atmosphere.

On the other hand, according to an embodiment, the heat dissipation of the controller 230 may be surely realized, and also, a flow path of the water inlet passage 100 may be provided so that the heat energy generated in the controller 230 may be collected to primarily preheat the raw water introduced into the hot water tank 210.

In detail, at least a portion of the water inlet passage 100 is disposed to pass through the controller 230. Here, the raw water passing through the water inlet passage 100 may be preheated while being heat-exchanged with the controller 230, and the preheated raw water may be heated after being introduced into the hot water tank 210 to generate hot water. Thus, energy efficiency of the hot water module 200 may be improved. Also, the heat of the controller 230 may be dissipated in a water cooling manner while being heat-exchanged as described above to surely secure the heat dissipation of the controller 230.

In this embodiment, at least a portion of the water inlet passage 100 may come into direct contact with the controller 230 or come into indirect contact with the controller 230 by using a separate medium.

Hereinafter, the water inlet passage 100 will be described in detail.

In this embodiment, the water inlet passage 100 may include an inlet part 110 having an inlet hole 101 in one side thereof to introduce the raw water from the outside, a heat exchange part 120 connected to the inlet part 110 and disposed to pass through the controller 230, and a connection part 130 connecting the heat exchange part 120 to the hot water tank 210.

Thus, the raw water introduced from the outside through the water inlet passage 100 may flow to the heat exchange part 120 via the inlet part 110 and absorb the heat energy generated in the controller 230 that comes into direct or indirect contact with the heat exchange part 120 while passing through the heat exchange part 120 and then be supplied to the hot water tank 210 through the connection part 130.

Referring again to FIGS. 2 and 3 a manipulation part 600 may be disposed in an upper portion of the sterilization kit 10. Also, a plurality of buttons are provided on the manipulation part 600, and a user inputs various commands such as hot water generation are inputted through the manipulation part 600.

Also, the controller 230 is connected to the manipulation part 600 to operate the heat generation unit 220 and a valve that will be described later according to the user's command inputted through the manipulation part 600. For example, when a hot water generation command is inputted through the manipulation part 600, the controller 230 turns the heat generation unit 220 on to adjust an output supplied to the heat generation unit 220 according to a hot water temperature inputted through the manipulation part 600.

Thus, the controller 230 needs to be disposed in the upper portion of the sterilization kit 10, which is adjacent to the manipulation part 600. Also, the controller 230 needs to be disposed in the upper portion of the sterilization kit 10 so that water comes into contact with the controller 230 although various safety accidents such as water leakage occur.

In this embodiment, the controller 230 may be disposed above the hot water tank 210.

Also, the inlet part 110 and the connection part 130 may be disposed in parallel to be spaced apart from each other.

In detail, the inlet part 110 and the connection part 130 may be vertically disposed. The inlet part 110 may transfer the water upward from a lower side, and the connection part 130 may transfer the water downward from the upper side. As described above, when the inlet part 110 and the connection part 130 are disposed in parallel to each other, it may be advantageous in space utilization.

Also, the heat exchange part 120 has a shape that is bent in an arch shape so that the water introduced through the inlet part 110 is discharged to the connection part 130.

For example, the heat exchange part 120 may have a 'U', '⊏', or 'V' shape. Also, the heat exchange part 120 may be bent in several times.

As described above, when the heat exchange part 120 has the bent shape, a flow path of the raw water passing through the heat exchange part 120 may be elongated, and thus, a time for the raw water, which is taken to pass through the heat exchange part 120 may increase, resulting in taking a larger amount of heat energy from the controller 230.

Also, when the heat exchange part 120 has the bent shape, a contact area with the controller 230 may increase to allow the raw water to more quickly take the heat energy from the controller 230.

As a result, when the heat exchange part 120 has the bent shape, the raw water passing through the heat exchange part 120 may be preheated because of quickly taking up a larger amount of heat energy from the controller 230, and thus, the controller 230 may quickly release a larger amount of heat energy to surely realize the heat dissipation thereof.

Also, an end of the connection part 130 may be connected to a lower portion of the hot water tank 210, and the water outlet passage 300 may be connected to an upper portion of the hot water tank 210.

Since the raw water is heated in the hot water tank 210, the hot water having a relatively high temperature due to convection current is collected in an upper portion of the hot water tank 210, and the raw water having a relatively low temperature may be collected in a lower portion of the hot water tank 210.

In this state, when the connection part 130 is connected to the lower portion of the hot water tank 210, and the water outlet passage 300 is connected to the upper portion of the hot water tank 210, only the high-temperature hot water heated in the hot water tank 210 may be discharged out of the hot water tank 210.

Thus, only sterilizing water heated at a high temperature may be provided to the water treatment apparatus.

Also, a steam passage 900 through which steam generated in the hot water tank 210 is discharged may be connected to the upper portion of the hot water tank 210, and a safety valve 910 opened at a pressure that is above a preset allowable pressure may be provided in the steam passage 900. In addition, the safety valve 910 may be disposed above the hot water tank 210.

The safety valve 910 may be configured to discharge steam generated when the hot water is heated in the hot water tank 210 and prevent an internal pressure of the hot water tank 210 from excessively increasing by the steam. The safety valve 910 may be configured to be opened at a preset pressure and have various structures as long as the steam generated in the hot water tank 210 is smoothly discharged.

Also, the steam passage 900 may extend to the outside of the sterilization kit 10 to easily discharge the steam. That is, a steam discharge hole 901 may be provided in an end of the steam passage 900, and the steam discharge hole 901 may be exposed to the outside of the sterilization kit 10.

Figure 4:
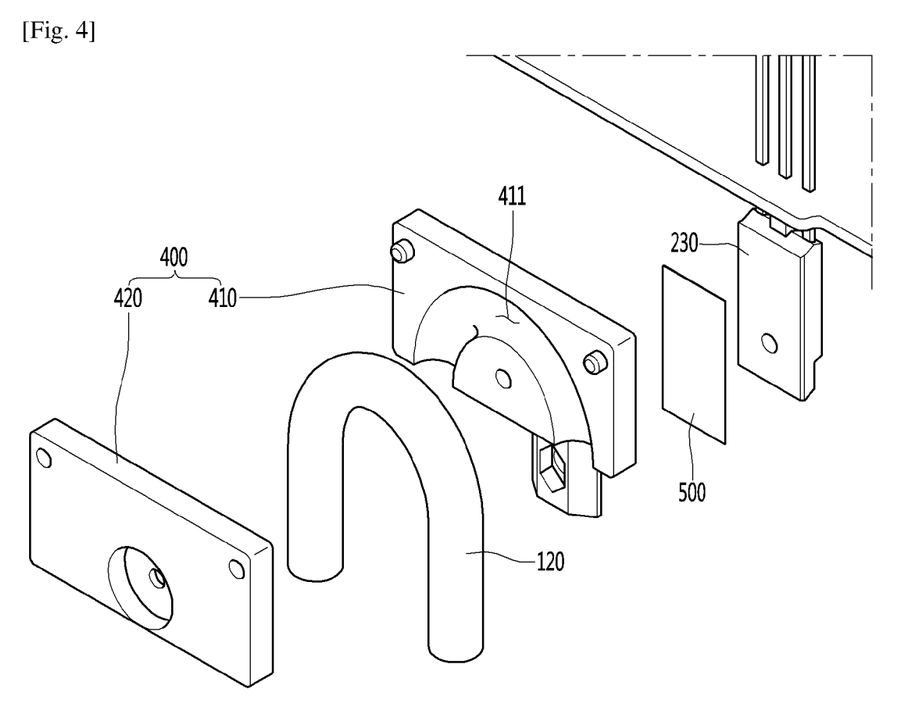
FIG. 4 is an exploded perspective view of a portion 'A' of FIG. 3.

FIG. 4 is an exploded perspective view of a portion 'A' of FIG. 3.

Referring to FIG. 4, the sterilization kit 10 according to an embodiment may further include a heat transfer member 400 coming into surface contact with the controller 230 and the heat exchange part 120 to transfer heat of the controller 230 to the heat exchange part 120.

Here, the heat transfer member 400 may be made of a material having high thermal conductivity. For example, the heat transfer member 400 may be made of an aluminum (Al) material.

Also, the heat transfer member 400 may be provided as a single body or a separably coupled assembly.

In the latter case, the heat transfer member 400 may include a first heat transfer member 410 having one surface coming into surface contact with the controller 230 and the other surface with an accommodation groove in which a portion of the heat exchange part 120 is accommodated and a second heat transfer member 420 having one surface with an accommodation groove in which the rest portion of the heat exchange part 120 is accommodated and coupled to the first heat transfer member 410.

Here, the first heat transfer member 410 and the second heat transfer member 420 may be disposed symmetrical to each other. Thus, the heat exchange part 120 may be accommodated in the first and second heat transfer members 410 and 420 without being exposed to the outside.

Also, the first heat transfer member 410 and the second heat transfer member 420 may be coupled to each other through a separate coupling unit such as a bolt.

As described above, when the heat transfer member 400 is provided as the assembly, the heat transfer member 400 may be easily coupled to the heat exchange part 120.

In this embodiment, an adhesion layer 500 may be disposed between the heat transfer member 400 and the controller 230.

The adhesion layer 500 may be implemented in various manners according to various embodiments as long as the heat transfer member 400 adheres to the controller 230. For example, the adhesion layer 500 may be provided in the form of a thin sheet made of a PET material.

According to an embodiment, the heat dissipation of the controller 230 may be realized through the simple manner in which a portion of the water inlet passage is disposed to pass through the controller 230, and the raw water supplied to the hot water tank 210 may be preheated.

Also, the above-described effects may be obtained through the sample operation of changing the water inlet passage of the existing produced sterilization kit 10.

In detail, when the water inlet passage 100 may be removed from the existing sterilization kit 10, i.e., only the water inlet passage 100 is partially replaced so that a portion of the water inlet passage 100 is disposed to pass through the controller 230, the effect according to the present disclosure may be obtained.

Also, while the water inlet passage 100 is replaced, when the heat transfer member 400 is fixed in such a manner in which the heat transfer member 400 is assembled with the heat exchange part 120, and then the heat transfer member 400 adheres to the controller 230 through an adhesion manner, the water inlet passage 100 may be simply fixed to the controller 230.

Referring again FIG. 1, at least one of a decompression valve 140 for reducing a pressure of the introduced raw water or a raw water valve 150 for controlling a flow of the introduced raw water may be provided in the inlet part 110 of the water inlet passage 100. That is, only the decompression valve 140 may be provided in the inlet part 110, only the raw water valve 150 may be provided in the inlet part 110, or both the decompression valve 140 and the raw water valve 150 may be provided in the inlet part 110.

The decompression valve 140 may adjust a pressure of the raw water supplied from a water supply source such as a faucet or the water treatment apparatus. That is, the pressure of the raw water supplied from the outside is constantly adjusted. Particularly, if the pressure of the raw water is excessively high, the decompression valve 140 may reduce the water pressure.

Also, the raw water valve 150 controls a flow of a fluid passing through the inlet part 110. In detail, the raw water valve 150 may have a switching function. Thus, when the raw water valve 150 is opened, the raw water may be supplied to the hot water tank 210. When the raw water valve 150 is closed, the supply of the raw water to the hot water tank 210 may be blocked.

The raw water valve 150 may be connected to the controller 230. Thus, when a hot water generation command is inputted through the manipulation part 600 by the user, the raw water valve 150 may be opened. On the other hand, when a hot water generation ending command is inputted, the raw water valve 150 may be closed.

Also, at least one of a flow rate sensor 160 detecting a flow rate of the raw water that is heat-exchanged with the controller 230 while passing through the controller 230 and a flow rate adjustment valve 170 adjusting a flow rate of the raw water may be provided in the connection part 130 of the water inlet passage 100. That is, only the flow rate sensor 160 may be provided in the connection part 130, only the flow rate adjustment valve 170 may be provided in the connection part 130, or both the flow rate sensor 160 and the flow rate adjustment valve 170 may be provided in the connection part 130.

Also, the flow rate sensor 160 and the flow rate adjustment valve 170 may be connected to the controller 230.

Thus, the flow rate adjustment valve 170 may be adjusted in opened degree of an inner diameter thereof according to a signal outputted from the controller 230 to adjust a flow rate of the raw water supplied to the hot water tank 210 via the connection part 130. Also, in some cases, the flow rate adjustment valve 170 may completely block the flow of the raw water supplied to the hot water tank 210.

The controller 230 may receive flow rate information detected by the flow rate sensor 160 to control an output of the heat generation unit 220 or adjust an opened degree of the flow rate adjustment valve 170 according to the inputted flow rate value.

For example, when the flow rate detected by the flow rate sensor 160 is greater than a preset flow rate, the output of the heat generation unit 220 may increase, or the inner diameter of the flow rate adjustment valve 170 may decrease.

For another example, when the flow rate detected by the flow rate sensor 160 is less than a preset flow rate, the output of the heat generation unit 220 may decrease, or the inner diameter of the flow rate adjustment valve 170 may increase.

Also, a check valve 180 may be disposed in the connection part 130 of the water inlet passage 100. Due to the check valve 180, the raw water absorbing the heat while passing through the heat exchange part 120 may flow to only the hot water tank 210.

Referring again to FIG. 1, the connection part 130 may include at least one of a first temperature sensor 810 measuring a temperature of water introduced into the hot water tank 210, a second temperature sensor 820 measuring a temperature of water received in the hot water tank 210, and a third temperature sensor 830 measuring a temperature of water discharged from the hot water tank 210.

Also, the temperature sensors 810, 820, and 830 may be connected to the controller 230.

Thus, the controller 230 may receive temperature information of the hot water, which is detected by the temperature sensors 810, 820, and 830 to control an output of the heat generation unit 220 or adjust an opened degree of the flow rate adjustment valve 170 according to the inputted temperature values.

For example, when the temperatures of the hot water, which are detected by the temperature sensors 810, 820, and 830, are less than a preset target temperature, the output of the heat generation unit 220 may increase, or the opened degree of the flow rate adjustment valve 170 may decrease. That is, a flow rate of the raw water introduced into the hot water tank 210 may decrease.

For another example, when the temperatures of the hot water, which are detected by the temperature sensors 810, 820, and 830, are greater than the preset target temperature, the output of the heat generation unit 220 may decrease, or the opened degree of the flow rate adjustment valve 170 may increase. That is, a flow rate of the raw water introduced into the hot water tank 210 may increase.

For another example, when the temperatures of the hot water, which are detected by the temperature sensors 810, 820, and 830, are equal to the preset target temperature, the output of the heat generation unit 220 and the opened degree of the flow rate adjustment valve 170 may be constantly maintained.

Referring again to FIG. 1, the sterilization kit 10 according to an embodiment may further include a cleaning passage 700 branched from the water inlet passage 100 and connected to the water outlet passage 300 after bypassing the hot water module 200.

The cleaning passage 700 is used only in a situation in which the hot water generation is not required.

The sterilization kit 10 according to an embodiment may operate in a hot water sterilizing mode and a general cleaning mode.

First, in the hot water sterilizing mode, the raw water introduced into the water inlet passage 100 may be heated while passing through the hot water module 200 to generate hot water and then discharged to the outside through the water outlet passage 300.

On the other hand, the raw water introduced into the water inlet passage 100 may pass through the cleaning passage 700 by bypassing the hot water module 200 and then be supplied to the outside through the water outlet passage 300 without being heated.

Also, a cleaning valve 710 controlling a flow of a fluid may be disposed in the cleaning passage 700.

Thus, when the cleaning valve 710 is opened, the raw water introduced into the water inlet passage 100 may be introduced into the cleaning passage 700, and when the cleaning valve 710 is closed, the introduction of the raw water into the cleaning passage may be blocked.

For example, in the hot water sterilizing mode, the cleaning valve 710 is closed, and the raw water valve 150 is opened to allow the raw water introduced into the water inlet passage 100 to pass through the hot water module 200 and to be heated, and then, the heated water is discharged to the outside through the water outlet passage 300.

On the other hand, in the general cleaning mode, the cleaning valve 710 may be opened, the raw water valve 150 may be closed to allow the raw water introduced into the water inlet passage 100 to bypass the hot water module 200 and then be supplied to the outside through the water outlet passage 300 without being heated.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A sterilization kit for a liquid treatment apparatus, which supplies hot liquid to the liquid treatment apparatus, in which raw liquid supplied from outside the sterilization kit is purified by passing through a filter and discharged after being cooled or heated as occasion demands, to sterilize the liquid treatment apparatus, the sterilization kit comprising:
a liquid inlet passage into which the raw liquid is introduced from the outside of the sterilization kit;
a hot liquid module comprising:
a hot liquid tank configured to receive the raw liquid introduced through the liquid inlet passage,
a heat generation unit configured to heat the liquid received in the hot liquid tank, and
a controller disposed to be spaced from outside of the hot liquid tank, and configured to control the heat generation unit; and
a liquid outlet passage configured to discharge hot liquid heated in the hot liquid module to the liquid treatment apparatus,
wherein the controller is configured such that at least a portion of the raw liquid introduced through the liquid inlet passage is to pass by the controller and the portion of the raw liquid is to be heat-exchanged based on heat energy of the controller,
wherein the heat energy of the controller is collected to primarily preheat the raw liquid to be introduced into the hot liquid tank.

2. The sterilization kit according to claim 1, wherein the liquid inlet passage comprises:
a liquid inlet part configured to receive the raw liquid from the outside of the sterilization kit;
a heat exchange part configured to connect to the liquid inlet part and disposed to pass through the controller; and
a connection part configured to connect the heat exchange part to the hot liquid tank.

3. The sterilization kit according to claim 2, wherein the liquid inlet part and the connection part are disposed in parallel to be spaced apart from each other.

4. The sterilization kit according to claim 3, wherein the heat exchange part is bent in an arch shape so that the liquid introduced through the liquid inlet passage is discharged to the connection part.

5. The sterilization kit according to claim 2, further comprising a heat transfer member configured to be in surface contact with the controller, and the heat transfer member is configured to transfer heat of the controller to the heat exchange part.

6. The sterilization kit according to claim 5, wherein the heat transfer member comprises:
a first heat transfer member having a first surface coming into surface contact with the controller and a second surface having an accommodation groove to receive a portion of the heat exchange part; and
a second heat transfer member having one surface with an accommodation groove in which another portion of the heat exchange part is accommodated and coupled to the first heat transfer member.

7. The sterilization kit according to claim 5, wherein an adhesion layer is disposed between the heat transfer member and the controller.

8. The sterilization kit according to claim 2, wherein the controller is disposed above the hot liquid tank.

9. The sterilization kit according to claim 2, wherein a decompression valve provided in the liquid inlet part is configured to reduce a pressure of the introduced raw liquid.

10. The sterilization kit according to claim 2, wherein a flow rate sensor is provided in the connection part and is configured to detect a flow rate of the raw liquid that is heat-exchanged with the controller while passing through the controller.

11. The sterilization kit according to claim 1, wherein an end of the liquid inlet passage is connected to a lower portion of the hot liquid tank, and the liquid outlet passage is connected to an upper portion of the hot liquid tank.

12. The sterilization kit according to claim 1, further comprising a cleaning passage branched from the liquid inlet passage and connected to the liquid outlet passage after bypassing the hot liquid module.

13. The sterilization kit according to claim 12, wherein the cleaning passage includes a cleaning valve configured to control a flow of a fluid.

14. The sterilization kit according to claim 2, wherein the connection part comprises at least one of a first temperature sensor configured to measure a temperature of liquid introduced into the hot liquid tank, a second temperature sensor configured to measure a temperature of liquid received in the hot liquid tank, and a third temperature sensor configured to measure a temperature of liquid discharged from the hot liquid tank.

15. The sterilization kit according to claim 1, comprising a steam passage connected to the hot liquid tank and configured to discharge steam generated in the hot liquid tank, and a safety valve provided in the steam passage and configured to open at a pressure that is above a preset allowable pressure.

16. The sterilization kit according to claim 2, wherein a raw liquid valve provided in the liquid inlet part is configured to control a flow of the introduced raw liquid.

17. The sterilization kit according to claim 2, wherein a flow rate adjustment valve is provided in the connection part and is configured to adjust the flow rate of the raw liquid.

* * * * *